United States Patent
Nekou et al.

(10) Patent No.: US 10,371,535 B1
(45) Date of Patent: Aug. 6, 2019

(54) AUTOMATIC MAP GENERATION

(71) Applicant: Ford Global Technologies, LLC, Dearborn, MI (US)

(72) Inventors: Homayoun Jamshidi Nekou, Sunnyvale, CA (US); Thomas Pilutti, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/975,464

(22) Filed: May 9, 2018

(51) Int. Cl.
| G08G 1/123 | (2006.01) |
| G01C 21/32 | (2006.01) |
| G08G 1/00 | (2006.01) |
| G09B 29/10 | (2006.01) |
| G01C 21/20 | (2006.01) |

(52) U.S. Cl.
CPC ........... *G01C 21/32* (2013.01); *G01C 21/20* (2013.01); *G08G 1/20* (2013.01); *G09B 29/106* (2013.01)

(58) Field of Classification Search
CPC ..... G01C 21/32; G01C 21/3676; G09B 29/06
USPC .. 340/995.19, 995.2, 995.22, 990, 430, 431, 340/432, 436, 446, 487
See application file for complete search history.

(56) References Cited

U.S. PATENT DOCUMENTS

| 7,561,962 | B2 | 7/2009 | Sumizawa | |
| 7,957,893 | B2 | 6/2011 | Smartt | |
| 8,660,795 | B2 | 2/2014 | Shimomura | |
| 8,874,361 | B2 | 10/2014 | Krumm | |
| 9,322,660 | B2 | 4/2016 | Mund | |
| 2008/0312814 | A1* | 12/2008 | Broadbent | G01C 21/3611 701/532 |
| 2009/0109245 | A1* | 4/2009 | Han | G01C 21/367 345/684 |
| 2009/0192706 | A1* | 7/2009 | Nomura | G01C 21/32 701/533 |
| 2009/0210147 | A1* | 8/2009 | Bauer | G01C 21/20 701/467 |
| 2012/0306923 | A1* | 12/2012 | Boschker | G01C 21/32 345/634 |
| 2014/0046588 | A1* | 2/2014 | Maezawa | G01C 22/00 701/487 |

FOREIGN PATENT DOCUMENTS

| CN | 103617731 B | 11/2015 |
| JP | 2017097088 A | 6/2017 |

OTHER PUBLICATIONS

An Automatic Road Network Construction Method Using Massive GPS Trajectory Data.

* cited by examiner

*Primary Examiner* — Tai T Nguyen
(74) *Attorney, Agent, or Firm* — David R. Stevens; Stevens Law Group

(57) ABSTRACT

Map data is augmented using GPS traces captured by navigation systems of vehicles. A GPS trace is reduced to key points identified based on magnitude of bearing changes and to maintain a maximum separation between key points. The locations and bearings of each key point are compared to locations and bearings along map traces in the map data. Where the location and bearing meet threshold conditions, the key point is merged with the map trace, such as by computing an average or weighted average. The manner in which the key point is merged is modified based on proximity of the key point to points in the map trace connected by segments of the map trace.

18 Claims, 9 Drawing Sheets

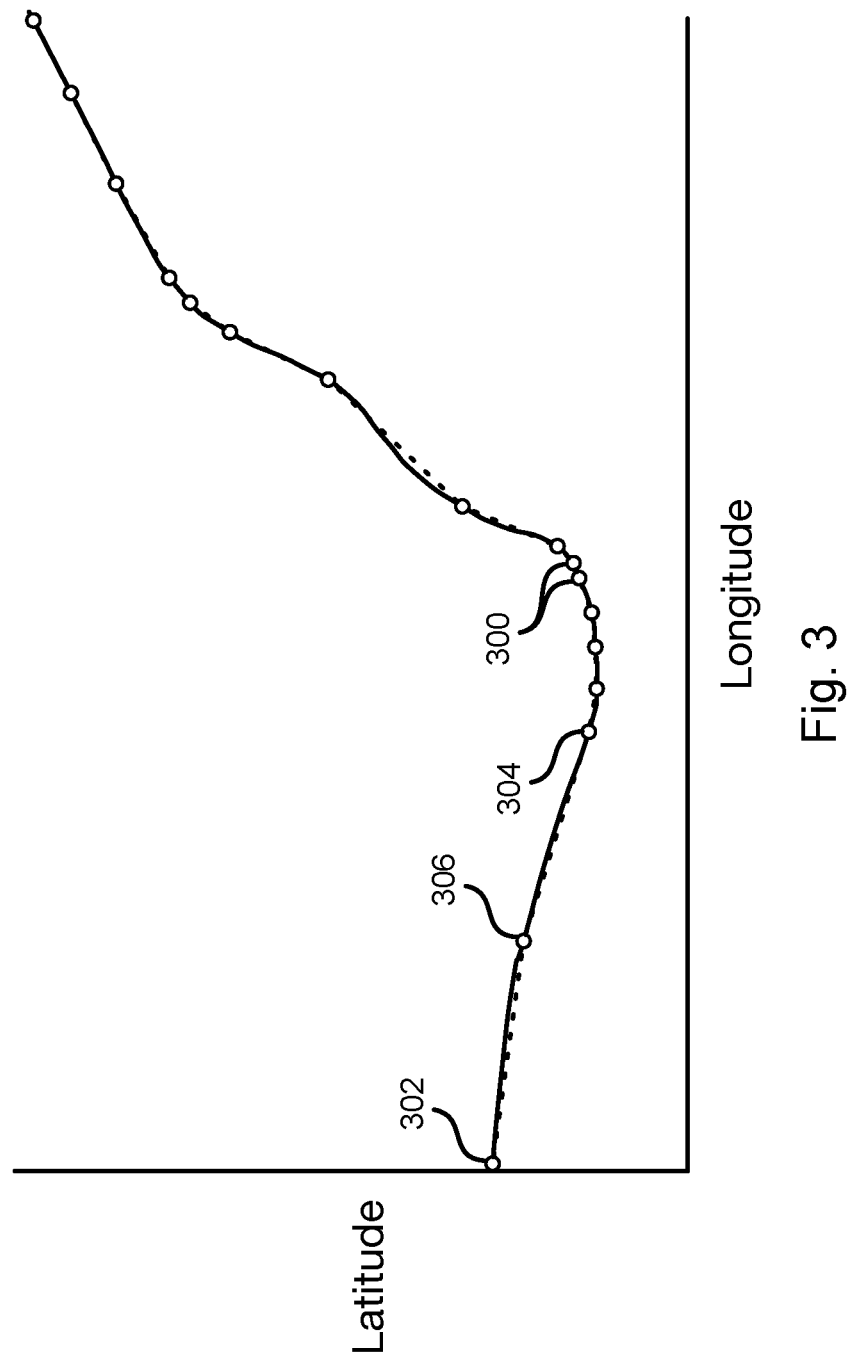

AUTOMATIC MAP GENERATION

BACKGROUND

Field of the Invention

This invention relates to creating maps from GPS traces.

Background of the Invention

Many drivers rely on map data to arrive at a destination. In many cases, a vehicle may incorporate an in-vehicle infotainment (IVI) system which incorporates a GPS (global positioning system) receiver. Such IVI systems store map data enabling it to provide turn-by-turn directions. This map data has some deficiencies. This map data must be purchased. The map data may also be inaccurate or not up to date.

What is needed is an improved approach for generating map data for use in navigation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3 is a plot of a GPS trace with key points identified in accordance with an embodiment of the present invention;

DETAILED DESCRIPTION

Figure 1:
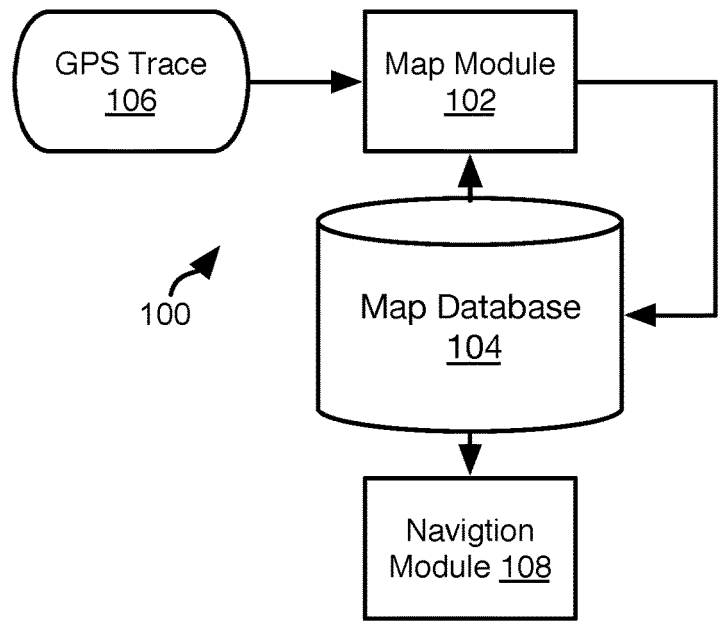
FIG. 1 is a schematic block diagram of components implementing a system in accordance with an embodiment of the present invention.

Referring to FIG. 1, the methods disclosed herein may be performed using the illustrated system 100. A map module 102 takes as an input a map database 104 that contains one or both of (a) curated map data compiled by a map maker to assist in navigation and (b) map data generated and/or modified according to the methods disclosed herein by evaluating GPS (global positioning system) trace.

The map module 102 further takes as an input a GPS trace 106. The GPS trace 106 may be an ordered listing of GPS readings received from a GPS receiver in a vehicle. Traces 106 may also be received from receivers carried by joggers, bikers, or any type of personal vehicle in order to create map data for recreational purposes. Accordingly, the GPS trace 106 may be defined as a series of raw GPS coordinates with segments of straight lines understood to extend between contiguous coordinates to define the trace. The ordering of the coordinates further defines the direction or bearing of the segments such that each segment points from the earlier-received coordinate to the later received coordinate of the contiguous coordinates defining the segment. The GPS trace 106 may include time data with each reading. Alternatively, the coordinates may be sampled at a consistent sampling period such that an elapsed time and therefore velocity for each pair of contiguous coordinates may be inferred.

Map data from the map database 104 may be updated by the map module 102 according to the GPS trace 106 according to the methods described herein. The updated map data may then be stored in the map database 104.

A navigation module 108, such as any navigation system known in the art for providing turn-by-turn direction or any other software making use of electronic maps may then make use of the map data in the database 104. The map data as generated according to the methods disclosed herein may be particularly useful for guiding autonomous vehicles.

Figure 2:
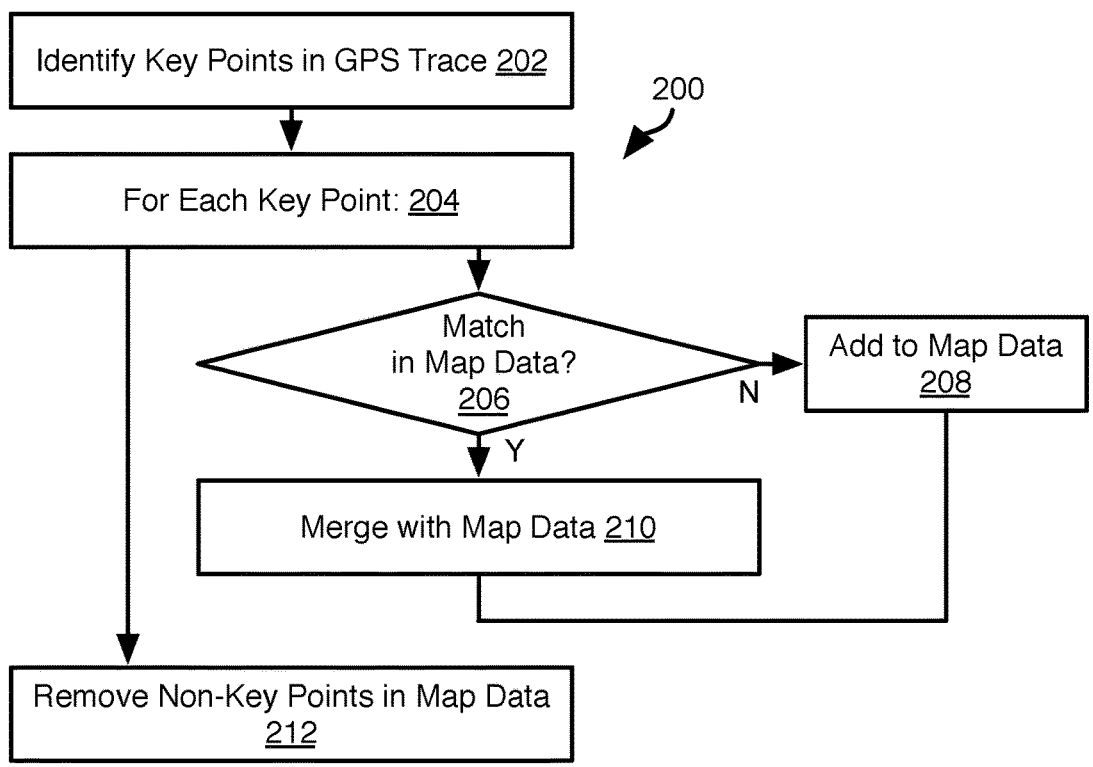
FIG. 2 is a process flow diagram of a method for adding a GPS trace to map data in accordance with an embodiment of the present invention.

Referring to FIG. 2, the map module 102 may implement the method 200 to add a GPS trace 106 to the map database 104. The method 200 may be performed repeatedly for many GPS traces 106 in order to better augment the map database 104.

The method 200 may include identifying 202 key points in the GPS trace 106. This process is described in detail with respect to FIG. 3 and includes identifying those points in the GPS trace 106 that are at bearing changes meeting a threshold magnitude or that are required such that the separation between key points does not exceed a pre-defined maximum separation. The result of step 202 is a set of key points each of which has a GPS coordinate and a bearing associated with it as well as segments connecting contiguous key points. The segments may be explicitly defined or may be understood to extend from a key point to an immediately following key point in the ordering. The ordering of the key points is the same as the ordering of the coordinates corresponding to the key points in the original GPS trace 106. Identifying 202 key points reduces the number of coordinates that need to be processed according to the methods described below.

The method 200 may then include iteratively processing 204 each key point ("the subject point") according to the subsequent steps of the method 200. In particular, the method 200 may include evaluating 206 the subject point with respect to the map data to determine whether the subject point has a matching map trace in the map data from the map database 104. This process is described below with respect to FIGS. 4A and 4B and includes evaluating the location and bearing of the subject point with respect to map traces in the map data. Where the location of the subject point is within a proximity threshold of a particular location on a map trace and the bearing of the subject point is within a bearing threshold of the bearing of that particular location on the map trace, the subject point may be determined 206 to match that map trace.

If no match is found, the subject point is added 208 to the map data in the map database. If an adjacent key point in the GPS trace has been merged (see step 210), a connection between the new point in the map data corresponding to the merged key point and the subject point may be included in the map data (e.g., a segment), thereby defining a branch. Where no adjacent key points of the subject point are merged, then the subject point and these adjacent key points will be added to the map trace with segments of the map trace explicitly or implicitly extending between them.

If a match is found, then the subject point is merged 210 with the map trace the subject point was found to match at step 206. This process is described in detail with respect to FIGS. 4B, 5, and 6A to 10B. In general, merging 210 includes determining an average of the location of the subject point and the particular point on the map trace that the subject point was found 206 to match to obtain a new point. The new point is then added to the map trace. Various refinements and exceptions to this approach are described below with respect to FIGS. 5 and 6A to 10B.

After one or more key points of the GPS trace 106 have been added to the map data in the map database 104, the map data may be evaluated according to step 212. Since points have been added to the map traces in the map data, it may be that there are excess points that no longer meet the definition of key points as described above with respect to step 202. Accordingly, points may be removed from traces in the map data that both of (a) do not meet the bearing change threshold and (b) are not required such that the span between other key points is not greater than the pre-defined maximum separation. Step 212 may be performed in the same manner as described below with respect to FIG. 3.

Referring to FIG. 3, a GPS trace 106 is represented by the solid line and includes a series of GPS readings each having a latitude and a longitude. The GPS readings may be evaluated in sets of three contiguous points, P1, P2, and P3, each including a latitude and a longitude defining its location. A vector V1 may be calculated as (P2−P1) and a vector V2 may be calculated as (P3−P1). A difference in angle of these vectors may be calculated, such as by calculating a bearing of each vector and subtracting one from the other. A difference in angle may be calculated as a cross product of the vectors V1 and V2 or unit vectors having the directions of the vectors V1 and V2. The magnitude of the cross product increases with change in bearing and is zero if the vectors V1 and V2 are parallel.

In some embodiments, the bearing change threshold is 8 degrees. Accordingly, if the change in bearing between vectors V1 and V2 has a magnitude of at least 8 degrees, then one of points P1, P2, and P3 may be selected as a key point. For example, the last value P3 may be selected as a key point. Other values for the bearing change threshold may be used, such as a value between 5 and 12 degrees. The key point may include the location of the selected point (e.g., P3) as well as a heading, such as one of the heading from P1 to P2, the heading from P2 to P3, or an average of these headings.

Key points may also be identified such that the separation between key points does not exceed some maximum separation. The maximum separation may be expressed as a distance or a number of raw GPS coordinates between points. For example, the maximum separation may be constrained to be 250 meters. A GPS trace may be processed starting at a first point in the GPS trace 104 and processing each point in order within the trace to determine whether it and the two points following it meet the bearing change threshold. If a particular point in the GPS trace is reached that does not meet the bearing change threshold but is separated from a previous key point by the maximum separation, that particular point may be selected as a key point.

In another approach, key points meeting the bearing change threshold are identified and then spans between these key points that exceed the maximum separation are identified. Points in the GPS trace in these spans are then selected as key points such that the separation between key points no longer exceeds the maximum separation. For example, the length of a span may be divided by a divisor (D) that is increased until the result of the division is less than the maximum separation. A number of key points equal to the D−1 may then be selected from the GPS trace such that they are distributed between the key points at either end of the span and the maximum separation is no longer exceeded.

The solid line in FIG. 3 represents a GPS trace 106. As is apparent, key points 300 are located on a curve where the bearing change threshold is met. Accordingly, there is a greater density of identified key points along curved portions of the GPS trace 106. The span between key points 302 and 304 is long and relatively straight. Accordingly, key point 306 may be selected such that the separation between points 302 and 306 and between points 306 and 304 does not exceed the maximum separation. A bearing may be calculated at key point 306 as well and the location and bearing stored as the key point 306.

Following identification of key points, a simplified trace may be defined as represented by the dotted line that extends between key points 300, 302, 304, 306 selected from the original GPS trace 106 (solid line). The ordering of the key points in the simplified trace is the same as their ordering in the original GPS trace.

Figure 4A:
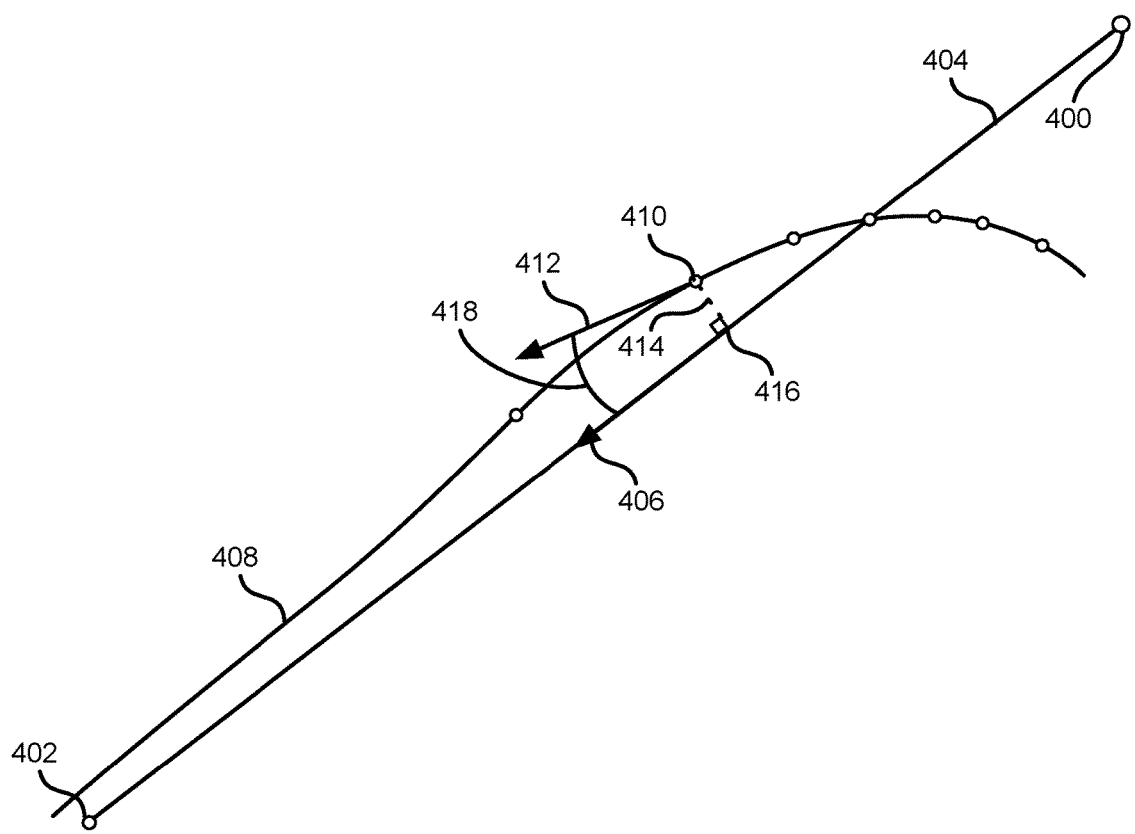
FIGS. 4A and 4B are plots of a GPS trace and map data illustrating the merging of a key point with map data in accordance with an embodiment of the present invention.

FIG. 4A illustrates an approach for determining whether a key point matches map data and for merging a key point. The map data may include a trace including, in order, point 400 and point 402 with a segment 404 extending from point 400 to point 402. Accordingly, the segment 404 has a constant bearing 406 pointing from point 400 to point 402.

A GPS trace 408 includes a key point 410 having the illustrated location and a bearing 412. The method may include calculating a length of a line 414 from the key point 410 to a location 416 on the segment 404, the line 414 being perpendicular to the segment 404. This length may be evaluated with respect to a pre-defined minimum separation threshold. A difference 418 between the bearing 412 and the bearing 406 may also be evaluated with respect to a pre-defined minimum bearing threshold. Where the length of line 414 meets the minimum separation threshold, e.g., is less than a pre-defined minimum separation threshold, and the difference 418 meets the minimum bearing threshold, e.g. is less than a minimum bearing threshold, then the key point 410 may be determined to match the segment 404.

The minimum bearing threshold may be the same as or different from the bearing change threshold used to identify key points. For example, the bearing change threshold may be 8 degrees whereas the minimum bearing threshold may be 16 degrees. The minimum separation threshold and minimum bearing threshold may be dynamic. For example, these thresholds may be a function of speed, e.g. increase with a velocity of the vehicle as indicated by the separation between contiguous points in the original GPS trace including the key point 410.

Figure 4B:
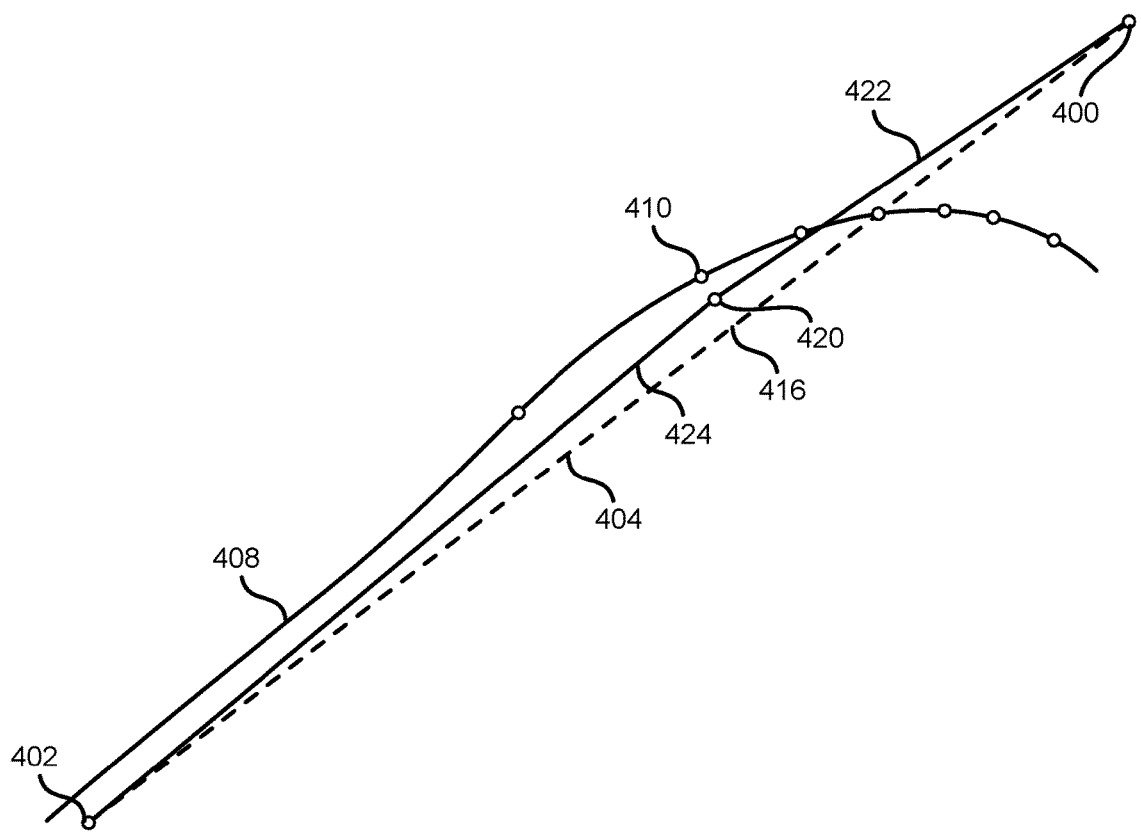

Referring to FIG. 4B, merging the key point 410 with the segment 404 may be performed by calculating a midpoint 420 of the point 410 and the location 416 on the segment 404 (shown dotted). This may be calculated as an average latitude and average longitude of the point 410 and the location 416, which may include a weighted average. For example, the segment 404 or the points 400, 402 at either end of the segment 404 may have a weight associated therewith. For example, each time a GPS trace is merged with a segment, that segment and/or the points 400, 402 at either end may have their weights augmented. Accordingly, where N GPS traces were used to define the segment 404 and/or the points 400, 402, the midpoint 420 may be calculated as $(N*L1+L2)/(N+1)$, where L1 is the latitude of the point 416 and L2 is the latitude of the point 410. The average longitude may be calculated in the identical manner. The weight of the new point 420 may be set to N=N+1 or incremented by some other amount in response to the merging with point 410. The weights of points 400, 402 may also be incremented or otherwise increased in the same manner in response to the merging with point 410.

The midpoint 420 is then added to the map trace. For example, the midpoint 420 may be added between points 400 and 402 such that a segment 422 from point 400 to point 420 is now included in the map trace and a segment 424 from point 420 to point 402 is also included in the map trace.

Figure 5:
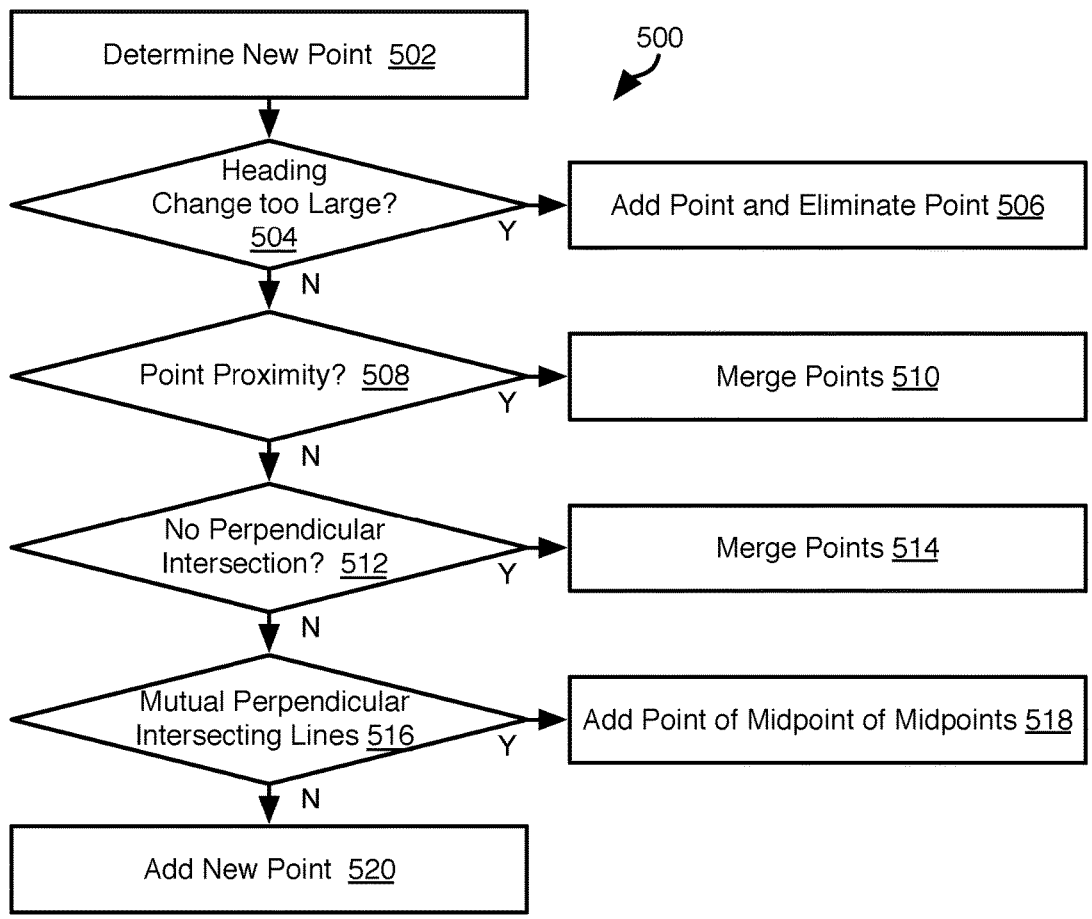
FIG. 5 is a process flow diagram of a method for merging key points of a GPS trace with map data in accordance with an embodiment of the present invention.

Referring to FIG. 5, the approach to merging shown in FIG. 4B may not be feasible in some situations. The method 500 may be executed by the map module 102 in order to handle these situations.

The method 500 may include determining 502 a new point location according to the approach of FIG. 4B (see, e.g., approach for calculating location of added point 420). The method 500 may then include evaluating 504 whether adding this new point would result in an excess heading change in the map trace. If so, then an existing point is removed from the map trace and a new point is added 506.

Figure 6A:
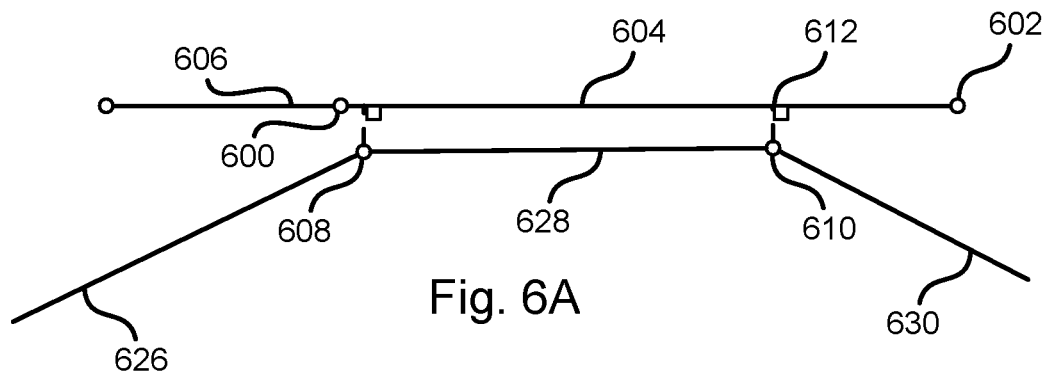
FIGS. 6A to 6C are diagrams illustrating merging of a key point with a map segment when the approach of FIG. 4B results in an excess heading change in accordance with an embodiment of the present invention.
Figure 6B:
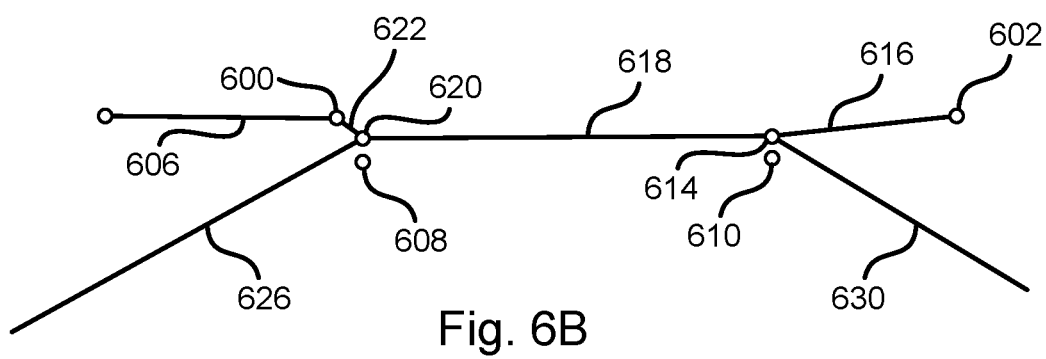
Figure 6C:
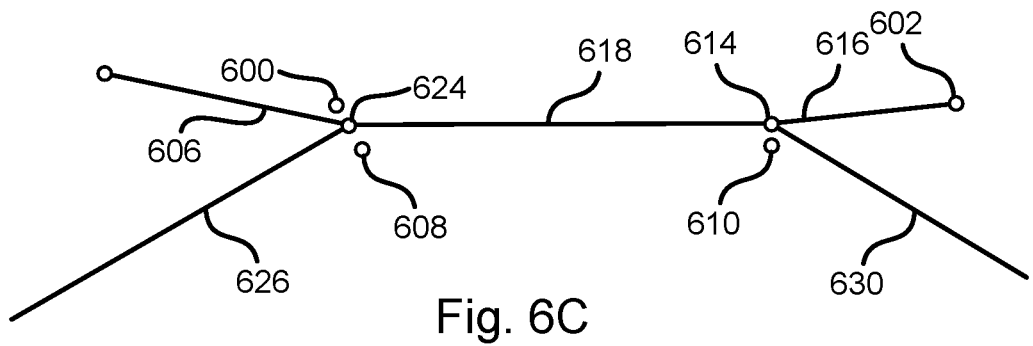

This approach is shown in FIGS. 6A to 6C. In the illustrated example, a map trace includes point 600 followed by point 602 with a segment 604 connecting them and another segment 606 connected to point 600. A GPS trace to be merged includes point 608 followed by point 610.

As shown in FIG. 6B, point 610 may be merged with the segment 604 by adding a new point 614 at a midpoint (average or weighted average) of the point 610 and the location 612 at which a line perpendicular to the segment 604 intersects the point 610. This results in the segment 604 being replaced with a segment 616 between point 602 and point 614 and a segment 618 between point 614 and a new point 620 created from merging point 608 with the segment 604. The new point 620 may be calculated for key point 608 in the same manner as for key point 610.

As is apparent in FIG. 6B, adding the new point 620 results in a sharp heading change between segment 622 between points 600 and 620 and the segment 606. It likewise results in a sharp heading change between segment 622 and segment 618.

Accordingly, if adding a point 620 according to the approach of FIG. 4B would result in a heading change that exceeds a predefined maximum heading change then it is not used. The maximum heading change may be measured as a comparison between one or more new segments that would be created from merging, (e.g., between segments 622 and 618 and between segments 626 and 618)

The maximum heading change may be the same as or different from the heading change used to identify key points. For example, the maximum heading change may be a value between 30 and 50 degrees, e.g. 45 degrees, for purposes of determining whether the approach of FIG. 4B may be used. The maximum heading change may be speed dependent, e.g. decrease with increasing speed as indicated by a speed limit in the region of the key point 608 or indicated by the GPS trace at the key point 608.

Instead of using the approach of FIG. 4B when the maximum heading change would result, the approach of FIG. 6C may be used. In this approach, the point 600 in the map trace closest to the point 608 is replaced with a new point 624 at a midpoint (average or weighted average) between the point 600 and the point 608. The segment 606 formerly connected to the point 600 now connects to the new point 624. Likewise, a segment 604 (or a new segment 618 resulting from merging of an adjacent point) that was connected to the point 600 is now connected to the new point 624. As is apparent, this greatly reduces the heading change that would have resulted using the approach of FIG. 6B.

As is apparent in FIGS. 6A to 6C, the GPS trace may include a segment 626 connected to key point 608, a segment 628 connected to key point 608 to key point 610, and a segment 630 connected to key point 610. As shown in FIG. 6B, when the key points 608, 610 at both ends of segment 628 are merged, that segment 628 is eliminated. However, as shown in FIGS. 6B and 6C, segments 626, 630 connecting to key points 608, 610 that are merged with the map trace may remain connected to the new points 624, 614 that replace those key points 608, 610 when the key points at the other ends of these segments 626, 630 are not merged.

In the examples below, merging of a single key point is described and segments of the GPS trace are connected to it. It shall be understood that where the key points at both ends of a segment are merged, this segment will be eliminated and replaced by a new segment connecting the new points that replace the key points.

Referring again to FIG. 5, the method 500 may include evaluating 508 whether the key point is within a threshold proximity to a point in the map trace. This threshold proximity may be the same as or less than the proximity used at step 206 to determine whether the key point should be merged with the map data.

Figure 7A:
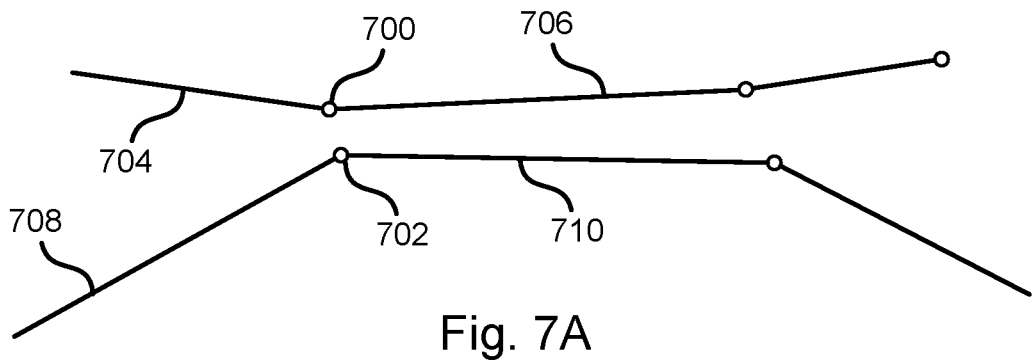
FIGS. 7A to 7B illustrate an approach to merging a key point with a point in map data according to proximity in accordance with an embodiment of the present invention.
Figure 7B:
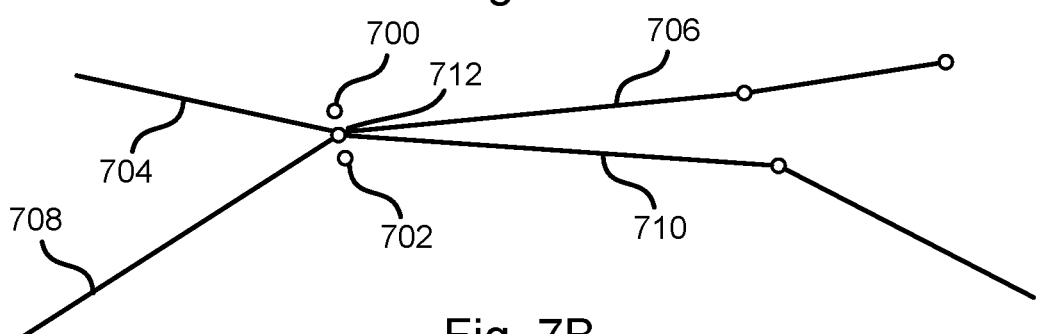

If the threshold proximity is found 508 to be met, then the key point may be merged 510 with the point in the map data satisfying the threshold proximity. This is illustrated in FIGS. 7A and 7B.

A map trace includes a point 700 that is within the threshold proximity of key point 702 in a GPS trace. The point 700 is connected to segments 704 and 706 in the map trace and the key point 702 is connected to segments 708 and 710.

A new point 712 is calculated as the midpoint of points 700 and 702 (average or weighted average). Segments 704, 706, 708, 710 that were formerly connected to points 700, 702 may then be connected to the new point 712. The segments 704, 706, 708, 710, may be modified when or if the other endpoints of the segments 708, 710 are merged according to the methods disclosed herein.

Referring again to FIG. 5, as shown in FIGS. 4B and 6A, a key point may be merged to a new point lying on a line that perpendicularly intersects a segment of a map trace. However, in some instances, such a line is found 512 to not be defined. Accordingly, in such embodiment, the key point may be merged 514 with a point on the map trace that is closest to it.

Figure 8A:
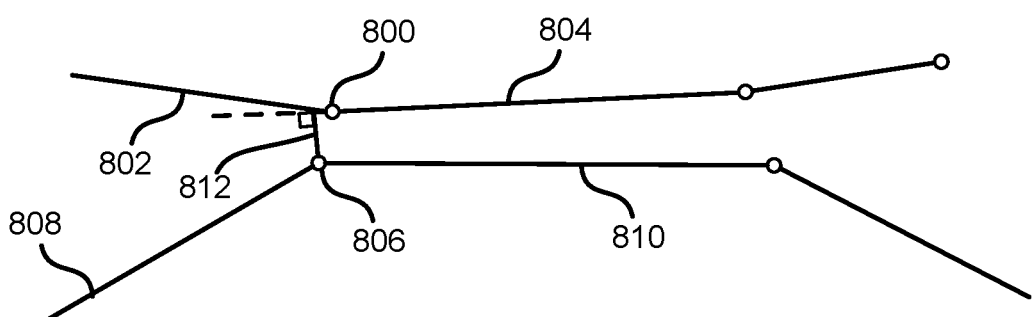
FIGS. 8A and 8B illustrate an approach to merging a key point with a point in map data where a perpendicular distance is not defined in accordance with an embodiment of the present invention.
Figure 8B:
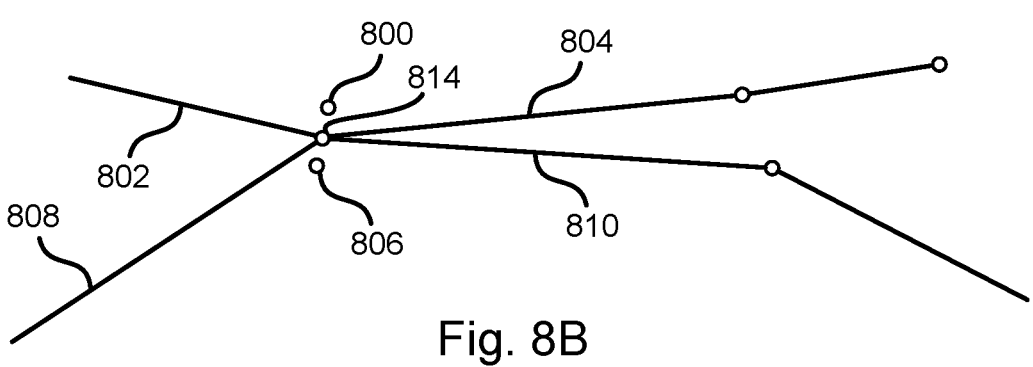

This approach is illustrated in FIGS. 8A and 8B. A map trace may include a point 800 connected to segments 802, 804. A GPS trace may include a key point 806 connected to segments 808, 810. As is apparent in FIG. 8A, a line 812 intersecting point 806 and perpendicular to segment 804 does not intersect the segment 804. Likewise, a line intersecting point 806 and perpendicular to segment 802 does not intersect the segment 802.

Accordingly, the point 800 of the map trace closest to the point 806 may be merged by averaging (e.g., a weighted or non-weighted average) the points 800, 806 to obtain a new point 814. Segments 802, 804, 808, 810 that connected to the points 800, 806 may then be connected to the new point 814. The segments 802, 804, 808, 810 may be modified when or if the other endpoints of the segments 808, 810 are merged according to the methods disclosed herein.

Referring again to FIG. 5, in some instances it may be found 516 that mutual perpendicular intersecting lines are defined. Accordingly, in such embodiments, the midpoints of these lines may be merged 518 to define the new point. This approach is illustrated in FIGS. 9A and 9B.

A map trace may include a point 900 connected to segments 902, 904. A GPS trace may include a point 906 connected to segments 908, 910. As shown, a line may be defined from point 900 that perpendicularly intersects segment 908. Likewise, a line may be defined from point 906 that perpendicularly intersects segment 902. Each of these lines has a corresponding midpoint 912, 914 (averaged or weighted averaged) of the point 900, 906 and the intersection location on the segment 908, 902.

Figure 9A:
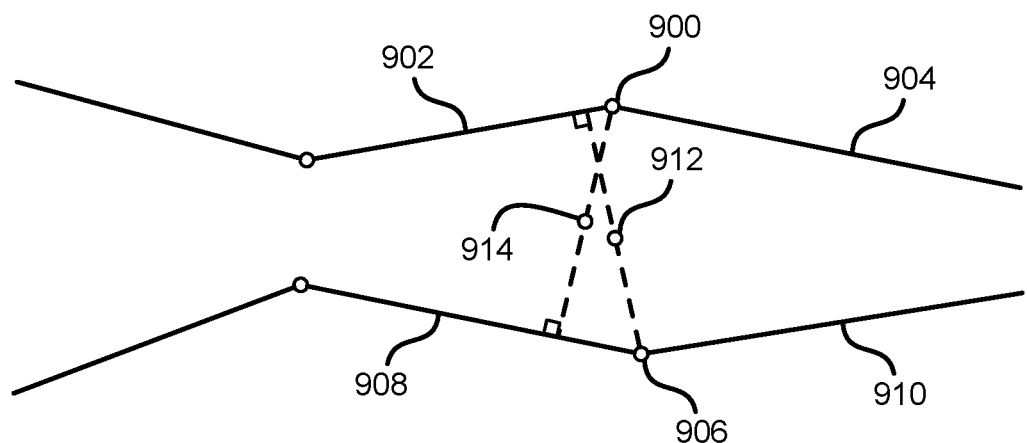
FIGS. 9A and 9B illustrate an approach to merging a key point with map data where mutual perpendicular distances are defined in accordance with an embodiment of the present invention.
Figure 9B:
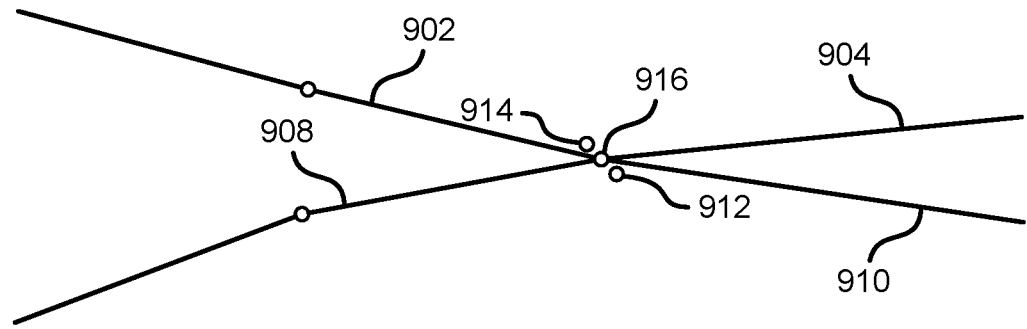

When the situation of FIG. 9A exists, a new point 916 may be added to the map trace at the midpoint of the midpoints 912, 914 (averaged or weighted averaged) as shown in FIG. 9B. Where a weighted average is used, the midpoint 912 may have a weight associated with the point 900 in the map trace.

The segments 902, 904, 908, 910 that were formerly connected to the points 900, 906 may then connect to the new point. The segments 902, 904, 908, 910 may be modified when or if the other endpoints of the segments 908, 910 are merged according to the methods disclosed herein.

Referring again to FIG. 5, where the conditions of steps 504-516 are not found to exist, then the new point determined according to the approach of FIG. 4B may then be added 520 to the map trace as described with respect to FIG. 4B.

Figure 10:
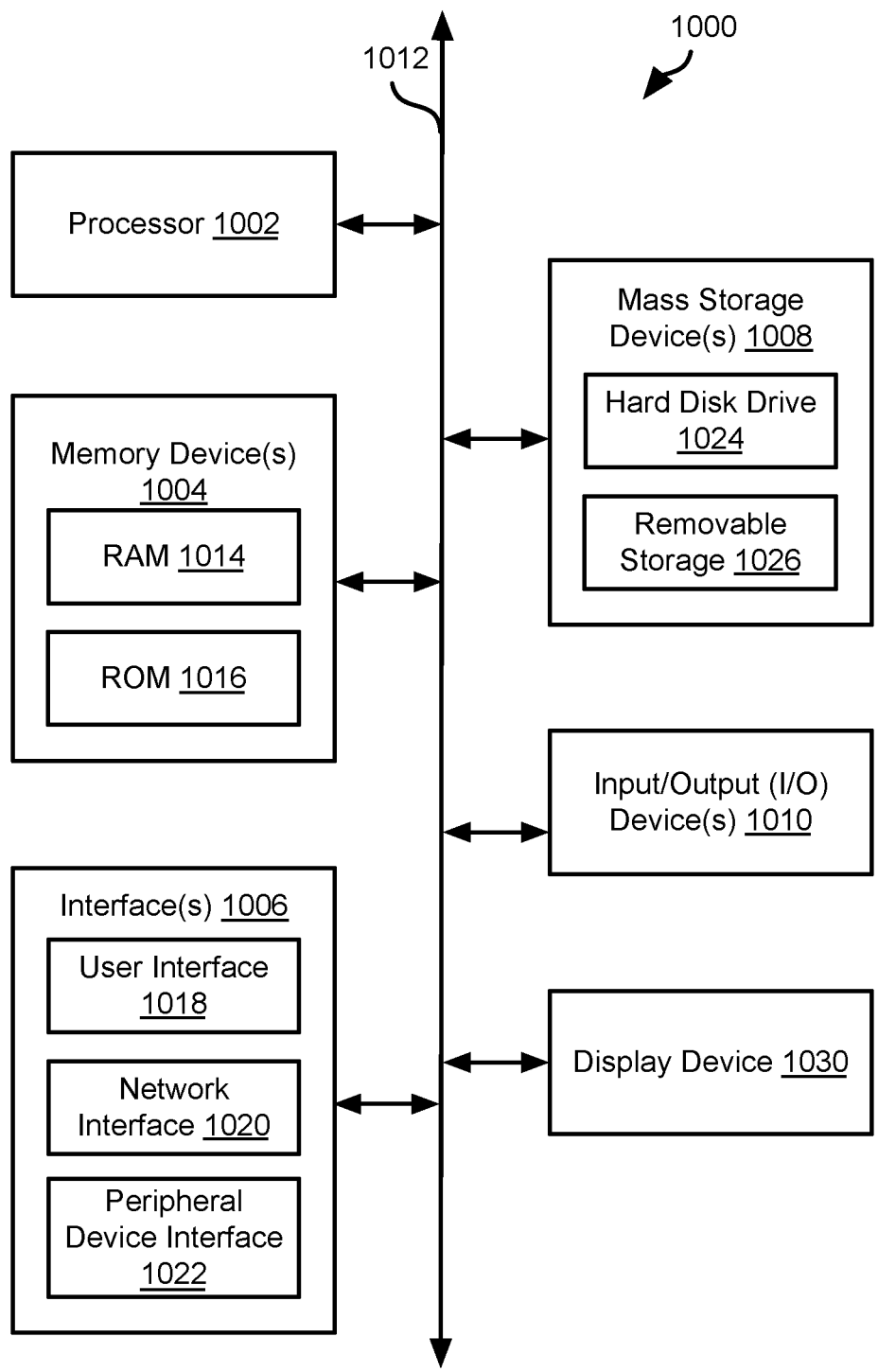
FIG. 10 is a schematic block diagram of an example computing device suitable for implementing methods in accordance with embodiments of the invention.

FIG. 10 is a block diagram illustrating an example computing device 1000. Computing device 1000 may be used to perform various procedures, such as those discussed herein. A computing device 1000 may be used to implement the map module 102 and be programmed to execute the methods disclosed herein.

Computing device 1000 includes one or more processor(s) 1002, one or more memory device(s) 1004, one or more interface(s) 1006, one or more mass storage device(s) 1008, one or more input/output (I/O) device(s) 1011, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more peripheral interfaces such as interfaces for printers, pointing devices (mice, track pad, etc.), keyboards, and the like.

Bus 1012 allows processor(s) 1002, memory device(s) 1004, interface(s) 1006, mass storage device(s) 1008, I/O device(s) 1010, and display device 1030 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   receiving, by a computer system, a map trace comprising a plurality of first points and defining a plurality of lines connecting adjacent first points of the plurality of first points;
   receiving, by the computer system, a second trace comprising a plurality of second points from a navigation system; and
   for each second point of a first portion of the plurality of second points, calculating, by the computer system, a new point for the plurality of first points as an average of a location of the each second point and a location on the map trace, the location on the map trace being one of:
  a point of the plurality of first points closest to the each second point and
  a point on a line of the plurality of lines that is closest to the each second point;
wherein the method further comprises:
  identifying the first portion of the plurality of second points as being within a distance threshold from the map trace and as having a heading within a first threshold heading change from the location on the map trace that is closest to each second point of the portion of the plurality of second points.

2. The method of claim 1, wherein the location on the map trace is a location on the map trace that is closest to the each second point.

3. The method of claim 2, wherein the new point is a weighted average of a location of the each second point and the location of the closest location lying on the map trace weighted by a weight associated with the map trace.

4. The method of claim 1, further comprising:
  identifying a plurality of key points among the plurality of second points, the portion of the plurality of second points being at least a portion of the plurality of key points;
wherein the plurality of key points are identified as at least one of:
  bearing points of the second points that meet a second threshold heading change within the second trace; and
  span points of the second points that are within a span of the second trace between bearing points that is greater than a maximum separation threshold.

5. The method of claim 1, further comprising adding the new point to the plurality of first points in the map trace.

6. The method of claim 1, further comprising, when adding the new point to the plurality of first points would result in a heading change in the map trace that exceeds a third threshold heading change:
  changing the new point to an average of the each second point and a first point of the plurality of first points that is closest to the each second point; and
  adding the new point to the plurality of first points in the map trace.

7. The method of claim 1, further comprising, when the each second point is within a threshold proximity to a particular first point of the plurality of first points, setting the new point to be an average of the each second point and the particular first point.

8. The method of claim 1, further comprising, when a perpendicular line from the map trace to the each second point is not defined, setting the new point to be an average of the each second point and a first point of the plurality of first point that is closest to the each second point.

9. The method of claim 1, further comprising, for each second point of a second portion of the plurality of second points:
  defining a first line from the each second point and perpendicularly intersecting the map trace;
  defining a second line from a first point of the plurality of first points closest to the each second point and perpendicularly intersecting the second trace; and
  when a first midpoint of the first line is within a threshold proximity to a second midpoint of the second line, setting the new point to be a third midpoint between the first midpoint and the second midpoint.

10. The method of claim 1, further comprising, following adding the new points for the portion of the plurality of second points to the plurality of first points:
  removing those first points of the plurality of first points that both of:
    do not meet the second threshold heading change within the map trace; and
    are not required such that a span of the map trace between first points of the plurality of points is not greater than a maximum separation threshold.

11. A system comprising one or more processing devices and one or more memory devices operably coupled to the one or more processing devices, the one or more memory devices storing executable code effective to cause the one or more processing devices to:
  receive a map trace comprising a plurality of first points and defining a plurality of first lines connecting adjacent points of the plurality of first points;
  receive a second trace comprising a plurality of second points from a navigation system;
  identify a portion of the plurality of second points as being within a distance threshold from the map trace and as having a heading within a first threshold heading change from a location on the map trace that is closest to each second point of the portion of the plurality of second points; and
  for each second point of the portion of the plurality of second points, calculate a new point for the plurality of first points that is a weighted average of the location on the map trace that is closest to the each second point weighted by a weight associated with the map trace and the second point, the location on the map trace being one of a first point of the plurality of first points that is closest to the each second point and a point on a line of the plurality of lines that is closest to the each second point.

12. The system of claim 11, wherein the executable code is further effective to cause the one or more processing devices to:
  identify a plurality of key points among the plurality of second points, the portion of the plurality of second points being selected exclusively from the plurality of key points, wherein the plurality of key points are identified as at least one of:
    bearing points of the second points that meet a second threshold heading change within the second trace; and
    span points of the second points that are within a span of the second trace between bearing points that is greater than a maximum separation threshold.

13. The system of claim 12, wherein the executable code is further effective to cause the one or more processing devices to, when adding the new point to the plurality of first points would result in a heading change in the map trace that exceeds a third threshold heading change:
  change the new point to an average of the each second point and a first point of the plurality of first points that is closest to the each second point; and
  add the new point to the plurality of first points in the map trace.

14. The system of claim 12, wherein the executable code is further effective to cause the one or more processing devices to, when the each second point is within a threshold proximity to a particular first point of the plurality of first points, set the new point to be an average of the each second point and the particular first point.

15. The system of claim 12, wherein the executable code is further effective to cause the one or more processing devices to, when a perpendicular line from the map trace to the each second point is not defined, set the new point to be an average of the each second point and a first point of the plurality of first point that is closest to the each second point.

16. The system of claim 12, wherein the executable code is further effective to cause the one or more processing devices to:
- define a first line from the each second point and perpendicularly intersecting the map trace;
- define a second line from a first point of the plurality of first points closest to the each second point and perpendicularly intersecting the second trace;
- when a first midpoint of the first line is within a threshold proximity to a second midpoint of the second line, set the new point to be a third midpoint between the first midpoint and the second midpoint; and
- add the new point to the plurality of first points of the map trace.

17. The system of claim 12, wherein the executable code is further effective to cause the one or more processing devices to, following adding the new points for the portion of the plurality of second points to the plurality of first points:
- remove those first points of the plurality of first points that both of:
  - do not meet the second threshold heading change within the map trace; and
  - are not required such that a span of the map trace between first points of the plurality of points is not greater than a maximum separation threshold.

18. The system of claim 11, wherein the executable code is further effective to cause the one or more processing devices to:
- add the new point to the plurality of first points in the map trace.

* * * * *